A. F. KEFFLO.
MACHINE FOR COUNTING BUTTONS.
APPLICATION FILED JAN. 10, 1918.
1,266,483.
Patented May 14, 1918.
2 SHEETS—SHEET 1.
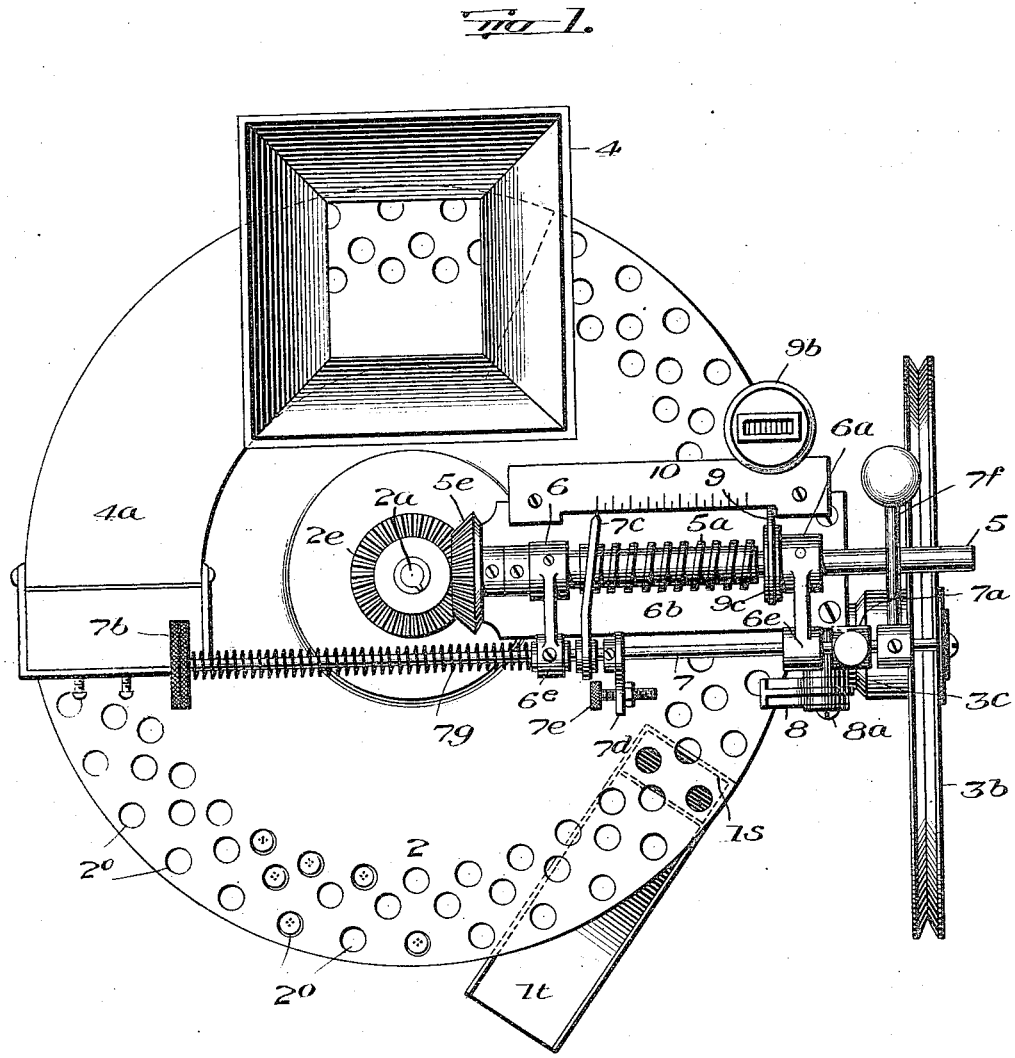

A. F. KEFFLO.
MACHINE FOR COUNTING BUTTONS.
APPLICATION FILED JAN. 10, 1918.
1,266,483. Patented May 14, 1918.
2 SHEETS—SHEET 2.
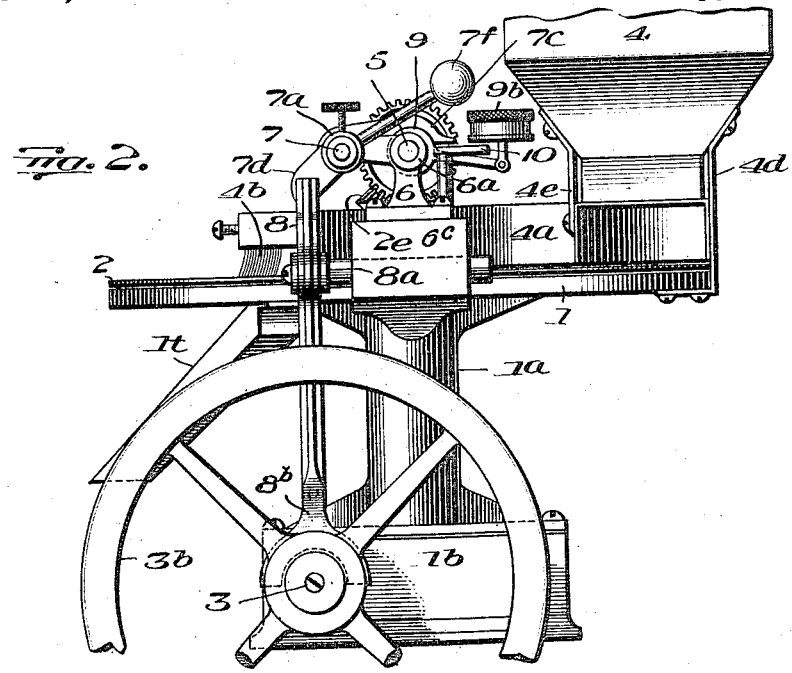
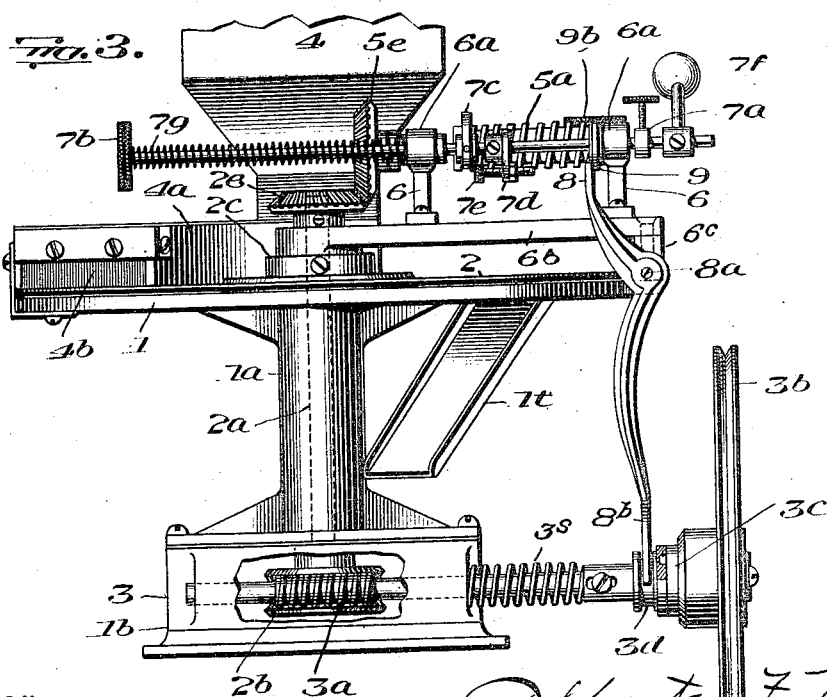

UNITED STATES PATENT OFFICE.

ALBERT F. KEFFLO, OF MUSCATINE, IOWA, ASSIGNOR TO AUTOMATIC BUTTON CO., OF MUSCATINE, IOWA.

MACHINE FOR COUNTING BUTTONS.

1,266,483.        Specification of Letters Patent.        Patented May 14, 1918.

Application filed January 10, 1918. Serial No. 211,167.

*To all whom it may concern:*

Be it known that I, ALBERT F. KEFFLO, a citizen of the United States, residing at Muscatine, in the county of Muscatine and State of Iowa, have invented certain new and useful Improvements in Machines for Counting Buttons; and I hereby declare that the following is a full, clear, and exact description thereof, reference being had to the accompanying drawings, which form part of this specification.

This invention is a novel improvement in machines for counting buttons, coins, blanks and the like; and I will herein refer to buttons, as explanatory but not definitive of the invention. The object of the invention is to provide a simple and reliable mechanism which can rapidly and automatically count and deliver a predetermined number of buttons for packaging to a suitable container or receiver, so that any desired number of buttons, as one or more gross, may be successively separated from a quantity of such buttons and delivered.

The invention includes means for separating the buttons; means for actuating the separating devices one or more times at each operation, so as to separate any desired quantity of buttons from a mass of them, and discharge same into a suitable receptacle or container; and means for automatically stopping the machine after each desired quantity of buttons has been separated until the machine is manually restarted. The invention also includes certain novel constructions and combinations of parts which will be hereinafter described.

I will explain the invention with reference to the accompanying drawings which illustrate one practical embodiment of the invention and will enable others to adapt and use the same; and I refer to the claims following the description for summaries of the essentials and novel combinations and and novel constructions of parts for which protection is desired.

In said drawings:

Figure 1 is a top plan view of the complete machine ready to start in operation.

Fig. 2 is a front view of Fig. 1 partly broken away.

Fig. 3 is a side elevation of Fig. 2 partly broken away.

The machine comprises a preferably circular table 1 fixedly mounted on a standard $1^a$ attached to a preferably hollow base $1^b$, which may be mounted upon any suitable support. Lying upon this table is a selective disk 2 having a hub $2^c$ attached to a shaft $2^a$, which extends through the standard $1^a$ and is suitably journaled therein, and may be driven by any suitable means. As shown shaft 2 has on its lower end a worm gear $2^b$ meshing with a worm $3^a$ on a shaft 3 suitably journaled in the base $1^b$ at right angles to the shaft $2^a$. On the shaft 3 is a loose pulley $3^b$, which may be driven by any suitable means, and said pulley has a clutch member $3^c$ on its hub adapted to be engaged by an opposed clutch member $3^d$ splined on the shaft 3 and movable to or from the clutch member $3^c$, and member $3^d$ is normally held in engagement with the clutch member $3^c$ by a spring $3^s$ between clutch member $3^c$ and base $1^b$ as shown in Fig. 3.

The disk 2 is provided with a certain number of holes or pockets $2^o$ each of which is large enough to hold one of the buttons or objects to be counted. In the example shown the disk has 144 such pockets so that if all the pockets are filled they will contain one gross of buttons.

The thickness of the disk 2 is slightly less than the thickness of the buttons or objects to be counted so that only one object can be contained at a time in each pocket.

Above the disk at one side of the machine is mounted a hopper 4 which may be supported above the disk in any suitable manner as by brackets $4^e$ and $4^d$ attached to the table 1. This hopper preferably has a lateral segmental portion $4^a$ extending over part of the disk to give the buttons in the hopper time and space to fill into the pockets of the disk as the latter rotates beneath the hopper. The buttons are placed in bulk in the hopper and naturally fall into the pockets as shown. Surplus buttons are prevented from escaping from the hopper on the disk by means of a brush $4^b$ placed at the outer end of the extension $4^a$ of the hopper; said brushes holding back any extra buttons which might lie on the surface of the disk in the hopper. The buttons can escape from the pockets in the disk after they pass out of the hopper through a slot $1^s$ in the table 1. The buttons drop from the pockets through the slot, by gravity, and into a chute or spout 1ᵗ by which they may be directed into a suitable container or receiver; not shown.

If the disk has 144 pockets it will be seen that at each revolution of such disk it can deliver one gross of buttons. In order to determine the amount of buttons delivered into the chute at each operation of the machine the number of revolutions of the disk are controlled; and it may be caused to make any desired number at each operation of the machine by suitable mechanism. In the example shown I have provided means whereby the disk can be automatically stopped after any desired number of revolutions from 1 to 10.

For this purpose the shaft 2ᵃ has a gear 2ᵉ on its upper end meshing with a corresponding gear 5ᵉ on the inner end of a shaft 5 journaled in bearings 6ᵃ in brackets 6 mounted on a plate 6ᵇ, the inner end of which may loosely surround the shaft 2ᵃ and be supported upon the hub 2ᶜ of disk 2; and its outer end may be supported on a bracket 6ᵇ attached to the table 1.

On the shaft 5 is keyed a spirally grooved member 5ᵃ which is adapted to be engaged by a latch-piece 7ᶜ attached to a rod 7 slidably mounted in bearings 6ᵉ on the plate 6ᵇ and preferably connected with the bearings 6ᵃ. A weighted arm 7ᶠ is attached to rod 7 and tends to normally rock the rod and hold the latch 7ᶜ in engagement with the spiral groove in member 5ᵃ. The inward movement of rod 7 is limited by a stop 7ᵃ adjustably attached to the rod outside the exterior bearing. On the inner end of this rod is a head 7ᵇ, and a helical expansion spring 7ᵍ is strung on the rod between the inner bearing 6ᵉ and head 7ᵇ; said spring acting to move the rod 7 and the parts connected thereto inward when the latch 7ᶜ is disengaged from the grooved member 5ᵃ.

To the rod 7 is adjustably attached an arm 7ᵈ provided with an adjustable tappet screw 7ᵉ adapted to contact with the upper end of a lever 8, which is mounted on a pivot 8ᵃ that may be carried by the bracket 6ᶜ as shown, and the lower end 8ᵇ of said lever is bifurcated and engages an annular groove in the clutch member 3ᵈ; and therefore when the upward end of the lever is moved outward the clutch member 3ᵈ will be disengaged from the clutch 3ᶜ, and this will permit the pulley 3ᵇ to run idle and stop the operation of the machine.

The latch 7ᶜ may project beyond the member 5 and serves as a pointer relative to a graduated index plate 10 mounted on studs on plate 6ᵇ, and said index plate, in the example shown, has ten graduations, one for each complete spiral in the groove in member 5ᵃ. By adjusting the stop 7ᵃ the inward movement of rod 7 can be regulated so that the latch 7ᶜ will primarily engage with any one of the spirals from 1 to 10.

In the example shown, the shaft 5 is geared to rotate once for each rotation of the disk, consequently each time that the latch traverses one complete spiral the disk will have made one revolution and one gross of buttons will have been discharged into the chute.

The number of revolutions of shaft 5 may be counted by any suitable means; as shown the shaft is provided with a cam 9ᶜ engaged by a link 9 which is connected with the operating lever of a register 9ᵇ mounted on the index plate 10 or other convenient support.

Operation: If it is desired to have the disk stopped after ten gross of buttons have been discharged into the spout 1ᵗ, the stop 7ᵃ is adjusted so that when the rod 7 is in its innermost position latch 7ᶜ will be engaged with the first or innermost spiral of the member 5ᵃ; the tappet 7ᵉ is also adjusted so that it will engage lever 8 and rock the latter so as to disengage the clutch and stop the machine when the latch 7ᶜ reaches the end of the last, or outermost, spiral in member 5ᵃ; the parts being so adjusted, a quantity of buttons is placed in the hopper and the machine started. As disk 2 revolves each pocket or hole therein takes a button from the hopper and discharges it through slot 1ˢ into the spout 1ᵗ, and for each revolution of the disk a gross of buttons will be discharged into the chute; the machine is stopped when the disk has rotated ten times and discharged ten gross of buttons by the tappet 7ᵉ shifting lever 8 and disengaging the clutch as above described. When ready to restart the machine the operator rocks rod 7 by lifting weight 7ᶠ so as to disengage latch 7ᶜ from the spiral groove and the spring 7ᵍ moves the rod 7 and connected parts inward until such movement is arrested by the stop 7ᵃ and latch 7ᶜ is reengaged with the desired spiral in member 5ᵃ.

If it is desired to stop the machine when less than ten revolutions have been made, the stop 7ᵃ is adjusted on the rod 7 so as to arrest the inward movement thereof when latch 7ᶜ is in position to engage the desired intermediate spiral, which is readily determined by the scale 10.

What I claim is:

1. In a machine for counting buttons and the like, the combination of a rotatable disk having pockets, means for supplying buttons to the disk pockets, means for rotating the disk, a clutch for throwing said means into or out of effective operation, a spirally grooved member, gearing for rotating said member in unison with the disk, a latch member adapted to engage the spiral groove member, and means connected with said latch member whereby the clutch may be disengaged when the disk has made a predetermined number of revolutions.

2. In a machine for counting buttons and the like, the combination of a rotatable disk having pockets, a hopper for containing buttons in mass and supplying same to the disk pockets, means for preventing surplus buttons escaping from the hopper, means for rotating the disk, a clutch for throwing said means into or out of effective operation, a rotatable spirally grooved member, gearing for rotating said member in unison with the disk, a latch member adapted to engage the spirally grooved member, and means connected with said latch member whereby the clutch is disengaged when the disk has made a predetermined number of revolutions.

3. In a machine for counting buttons and the like the combination of a rotatable disk having pockets, means for supplying buttons to the disk pockets, means for preventing surplus buttons escaping from the hopper, means for rotating the disk, a clutch for throwing said means into or out of effective operation, a spirally grooved member, gearing for rotating said member in unison with the disk, a slidable rod beside the spirally grooved member, a latch member connected with the rod adapted to engage the spirally grooved member, a clutch lever, and means connected with said rod adapted to cause said lever to disengage the clutch when the disk has made a determined number of revolutions.

4. In a machine for counting buttons and the like the combination of a rotatable disk having a predetermined number of pockets, a hopper for containing buttons in mass and supplying same to the disk pockets, means for preventing surplus buttons escaping from the hopper, means for rotating the disk, a clutch for throwing said means into or out of effective operation, a spirally grooved member, gearing for rotating said member in unison with the disk, a slidable rod beside the spirally grooved member, a latch member connected with the rod adapted to engage the spirally grooved member, a clutch lever, and means connected with said rod adapted to engage said lever and cause it to disengage the clutch when the disk has made the determined number of revolutions.

5. In a machine for counting buttons and the like the combination of a rotatable disk having pockets, means for supplying buttons to the disk pockets, means for preventing surplus buttons escaping from the hopper, means for rotating the disk, a clutch for throwing said means into or out of effective operation, a spirally grooved member, gearing for rotating said member in unison with the disk, a slidable rod beside the spirally grooved member, a latch member connected with the rod adapted to engage the spirally grooved member, a clutch lever, and means connected with said rod adapted to cause said lever to disengage the clutch when the disk has made a determined number of revolutions, a hopper above the disk having a lateral extension for supplying buttons to the pockets in the disk and means for preventing surplus buttons escaping from the hopper.

6. In a machine for counting buttons and the like the combination of a rotatable disk having a predetermined number of pockets, a hopper for containing buttons in mass and supplying same to the disk pockets, means for preventing surplus buttons escaping from the hopper, means for rotating the disk, a clutch for throwing said means into or out of effective operation; a spirally grooved member, gearing for rotating said member in unison with the disk; a slidable rod beside the spirally grooved member, a latch member connected with the rod adapted to engage the spirally grooved member, a clutch lever, and means connected with said rod adapted to engage said lever and cause it to disengage the clutch when the disk has made the determined number of revolutions; a hopper above the disk having a lateral extension for supplying buttons to the pockets in the disk, and a brush for preventing surplus buttons escaping from the hopper.

7. The herein described machine for counting buttons comprising a rotatable disk having pockets, gearing for rotating said disk, a driving member and means for clutching or declutching the driving member from the disk operating gearing, a lever for operating said clutch, a spirally grooved member, gearing between said member and the disk driving gear, a longitudinally movable rod beside the said member, a latch on said rod adapted to engage said member, means on said rod adapted to cause the clutch lever to disengage the clutch when the disk has made a determined number of revolutions, an index adjacent the latch for determining the number of revolutions to be made by the disk and means for normally holding the latch in engagement with the spirally grooved member.

8. The herein described machine for counting buttons comprising a rotatable disk having pockets, gearing for rotating said disk, a driving member and means for clutching or declutching the driving member from the disk operating gearing, a lever for operating said clutch, a spirally grooved member, gearing between said member and the disk driving gear, a longitudinally movable rod beside said member, a latch on said rod adapted to engage the member, and means operated by said rod to cause the clutch lever to disengage the clutch when the disk has made a determined number of revolutions, a spring for returning the rod to normal position and an adjustable stop for limiting the inward movement of the rod.

9. The herein described machine for counting buttons, comprising a table having a discharge slot, a rotatable disk mounted on said table and having pockets adapted to register with said slot as the disk rotates, gearing for rotating said disk, a driving member, means for clutching or declutching the driving member from the disk operating gearing, a lever for operating said clutch, a spirally grooved member, gearing between said member and the disk driving gear, a longitudinally movable rod beside the member, a latch on said rod adapted to engage the member, adjustable tappets on said rod adapted to engage the clutch lever and cause it to disengage the clutch when the disk has made a determined number of revolutions, a spring for returning the rod to normal position, and an adjustable stop for limiting the inward movement of the rod.

10. The herein described machine for counting buttons, comprising a table having a discharge slot, a rotatable disk mounted on said table and having pockets adapted to register with said slot as the disk rotates, gearing for rotating said disk, a driving member, means for clutching or declutching the driving member from the disk operating gearing, a lever for operating said clutch, a spirally grooved member, gearing between said member and the disk driving gear, a longitudinally movable rod beside the member, a latch on said rod adapted to engage the member, adjustable tappets on said rod adapted to engage the clutch lever and cause it to disengage the clutch when the disk has made a determined number of revolutions, a spring for returning the rod to normal position, and an adjustable stop for limiting the inward movement of the rod, a scale adjacent the member for determining the number of revolutions made by the disk and means for normally holding the latch in engagement with the spirally grooved member.

In testimony that I claim the foregoing as my own, I affix my signature.

ALBERT F. KEFFLO.

Copies of this patent may be obtained for five cents each, by addressing the "Commissioner of Patents, Washington, D. C."